United States Patent
Noble et al.

(10) Patent No.: US 11,144,756 B2
(45) Date of Patent: Oct. 12, 2021

(54) METHOD AND SYSTEM OF DISTINGUISHING BETWEEN A GLANCE EVENT AND AN EYE CLOSURE EVENT

(71) Applicant: SEEING MACHINES LIMITED, Fyshwick (AU)

(72) Inventors: John Noble, Fyshwick (AU); Grant Grubb, Ainslie (AU)

(73) Assignee: SEEING MACHINES LIMITED, Fyshwick (AU)

( * ) Notice: Subject to any disclaimer, the term of this patent is extended or adjusted under 35 U.S.C. 154(b) by 92 days.

(21) Appl. No.: 16/091,356

(22) PCT Filed: Mar. 30, 2017

(86) PCT No.: PCT/AU2017/050272
§ 371 (c)(1),
(2) Date: Oct. 4, 2018

(87) PCT Pub. No.: WO2017/173480
PCT Pub. Date: Oct. 12, 2017

(65) Prior Publication Data
US 2019/0122044 A1    Apr. 25, 2019

(30) Foreign Application Priority Data

Apr. 7, 2016 (AU) ................................. 2016901290

(51) Int. Cl.
*G06K 9/00* (2006.01)
(52) U.S. Cl.
CPC ..... *G06K 9/00617* (2013.01); *G06K 9/00597* (2013.01)

(58) Field of Classification Search
CPC .... G08B 21/06; G08B 29/186; G08B 29/188; G08B 29/26; A61B 5/18; A61B 5/163;
(Continued)

(56) References Cited

U.S. PATENT DOCUMENTS 5,867,587 A    2/1999  Aboutalib et al.
5,878,156 A    3/1999  Okumura
(Continued)

FOREIGN PATENT DOCUMENTS

EP    1732028 A1    12/2006
EP    2298155 A2    3/2011
(Continued)

*Primary Examiner* — Golam Sorowar
(74) *Attorney, Agent, or Firm* — Jason P. Mueller; FisherBroyles, LLP (57) ABSTRACT

Described herein are methods and systems of distinguishing between a glance event and an eye closure event in a subject monitoring system. A method includes capturing a number of images of the subject's face including at least one eye of the subject over a period of time; processing the images to determine a closure state of at least one eye; detecting potential eye closure events in which the closure state of at least one eye is determined to be in a closed state; for corresponding detected potential eye closure event, determining a head pitch angle of the subject and classifying the potential eye closure event as a glance event if a head pitch angle of the subject is detected to change by an angle greater than a predetermined head pitch angle and otherwise classifying the potential eye closure event as an eye closure event.

19 Claims, 9 Drawing Sheets

(58) Field of Classification Search
CPC ..... A61B 3/113; A61B 5/7264; A61B 3/0025; A61B 5/00; A61B 5/0205; A61B 5/0476; A61B 5/055; A61B 5/11; A61B 5/1103; A61B 5/1128; A61B 5/14553; A61B 5/4809; A61B 5/6893; A61B 5/7246; A61B 5/7275; G06K 9/0061; G06K 9/00845; G06K 9/00281; G06K 9/00597; G06K 9/00255; G06K 9/00308; G06K 9/00335; G06K 9/00248; G06K 9/00275; G06K 9/00288; G06K 9/00302; G06K 9/00362; G06K 9/00604; G06K 9/2018; G06K 9/52; G06K 9/6292

See application file for complete search history.

(56) References Cited

U.S. PATENT DOCUMENTS

| | | | |
|---|---|---|---|
| 7,043,056 B2 | 5/2006 | Edwards et al. | |
| 8,139,819 B2* | 3/2012 | Morita | A61B 5/18 340/575 |
| 2010/0014711 A1* | 1/2010 | Camhi | B60K 28/06 382/104 |
| 2014/0204193 A1* | 7/2014 | Zhang | G06K 9/00597 348/78 |
| 2015/0023603 A1* | 1/2015 | Whitehill | G06K 9/00281 382/195 |
| 2016/0001781 A1* | 1/2016 | Fung | B60K 28/02 701/36 |
| 2016/0171321 A1* | 6/2016 | Ohsuga | A61B 5/168 345/419 |
| 2016/0272217 A1* | 9/2016 | Kim | G06K 9/00255 |
| 2018/0204078 A1* | 7/2018 | Seng | B60W 50/16 |

FOREIGN PATENT DOCUMENTS

| | | |
|---|---|---|
| EP | 1801730 | 9/2011 |
| EP | 2564766 | 3/2013 |
| EP | 2564777 A1 | 3/2013 |

* cited by examiner

METHOD AND SYSTEM OF DISTINGUISHING BETWEEN A GLANCE EVENT AND AN EYE CLOSURE EVENT

FIELD OF THE INVENTION

The present invention relates to face tracking and in particular to a method and system for distinguishing between a glance event and an eye closure event by a subject being monitored. Particular embodiments are adapted for detecting a downward glance by a driver or operator of a vehicle in a vehicle monitoring system. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Driver monitoring systems are used to monitor the alertness/drowsiness and attention/distraction of drivers in vehicles. These monitoring systems utilize at least one driver-facing camera to capture images of the driver's face while driving and an image processor to process the images to extract various characteristics of the driver. Such characteristics include the driver's head pose, eye gaze direction and eye closure. These characteristics are used to derive measures of driver alertness/drowsiness and driver attention/distraction from a given task such as viewing the road.

When driving a vehicle, a measure of driver alertness/distraction can be obtained based on measurements of the driver's head pose and eye gaze direction over time to determine an amount of time that the driver is looking away from the road ahead. A measure of alertness/drowsiness may be based on a combination of eye closure measurements and head pose or eye gaze direction.

Figure 1:
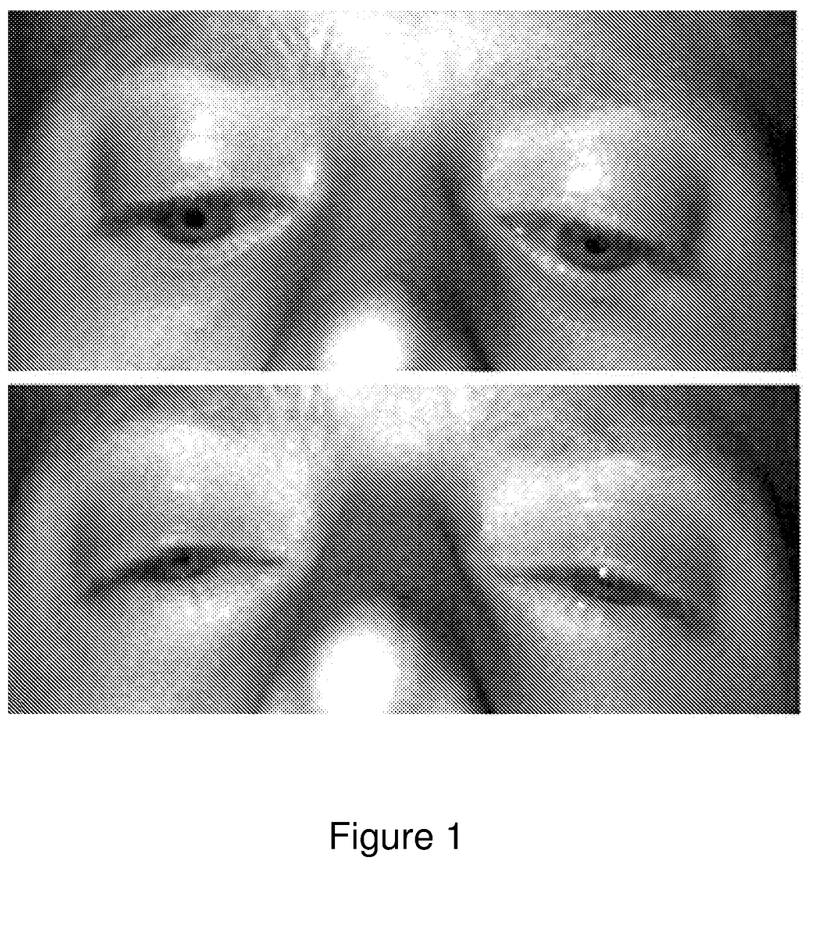
FIG. 1 illustrates two images of a subject, the top panel illustrates the subject in an alert state but glancing down at a mobile phone and the bottom panel illustrates a partial eye closure of the subject due to drowsiness.

Due to the position of the imaging camera relative to the driver's face, current systems encounter a problem in that distinction between an eye closure and a glance event such as a look down is difficult. This is illustrated in FIG. 1, which illustrates, in the top panel, an alert glance down at a mobile phone and, in the bottom panel, a partial eye closure due to drowsiness. From the perspective of the camera, the eyes of the driver appear to close in both situations, despite the fact that, in a look down event, the driver's eyes may actually be far from closed.

By way of example, U.S. Pat. No. 5,867,587 describes a fatigue measurement using blink detection and U.S. Pat. No. 5,878,156 describes a technique for fatigue measurement based on detecting the state of the eyes. Both methods are fragile if applied to tasks that involve wide ranging head motions, such as when driving a car.

Incorrect distinctions between look down events and eye closures can cause the driver monitoring system to incorrectly characterize the driver as fatigued or drowsy, which can lead to false alerts produced by the operator monitoring system. The incorrect distinctions can also skew long term characterizations of that driver that are derived from historical monitoring data.

SUMMARY OF THE INVENTION

In accordance with a first aspect of the present invention there is provided a method of distinguishing between a glance event and an eye closure event in a subject monitoring system, the method including:

a) capturing a number of images of at least a portion of the subject's face including at least one eye of the subject over a period of time, each image being captured at a corresponding time within the period of time;

b) processing the images to determine a closure state of the at least one eye;

c) detecting potential eye closure events in which the closure state of the at least one eye is determined to be in a closed state;

d) for times corresponding to a detected potential eye closure event, determining a corresponding head pitch angle of the subject; and e) classifying the potential eye closure event as a glance event if a head pitch angle of the subject is detected to change by an angle greater than a predetermined head pitch angle across the images corresponding to the detected potential eye closure event, and otherwise classifying the potential eye closure event as an eye closure event.

In one embodiment the closure states include an open state and a closed state. In another embodiment the closure states include a plurality of states indicative of a degree of closure of the at least one eye. In this latter embodiment the degree of closure is preferably a value between 0 and 1.

Potential eye closure events preferably include events in which the degree of closure of the at least one eye is determined to be less than a predetermined eye closure threshold. In one embodiment the predetermined eye closure threshold is 0.3.

In one embodiment the predetermined head pitch angle is ±5 degrees. In one embodiment the head pitch angle is determined relative to an angle recorded prior to the potential eye closure event. In another embodiment the head pitch angle is determined relative to an angle between the subject's face and a camera which captures the images.

In one embodiment the times corresponding to the detected potential eye closure events include times corresponding to images captured immediately prior to the event and times corresponding to images captured immediately after the event.

In one embodiment the head pitch angle of the subject is determined from a head pose estimate. In one embodiment the head pose estimate is calculated prior to determining a closure state of the at least one eye.

In one embodiment the method includes the step:

d)(i) for images corresponding to a detected potential eye closure event, processing the images to determine a corresponding head yaw angle of the subject.

In one embodiment the method includes the step:

f) for glance events, classifying the glance event as a 'vertical glance down' event if:
  (i) the head pitch angle of the subject is detected to be downward; and
  (ii) the head yaw angle of the subject is detected to change by an angle less than a predetermined head yaw angle across the images corresponding to the detected potential eye closure event.

In one embodiment the method includes the step:

g) for glance events, classifying the glance event as an 'angled glance down' event if:
  (i) the head pitch angle of the subject is detected to be downward; and
  (ii) the head yaw angle of the subject is detected to change by an angle greater than or equal to the predetermined head yaw angle across the images corresponding to the detected potential eye closure event.

In one embodiment the predetermined head yaw angle is 5 degrees.

In one embodiment the step of classifying the potential eye closure event as a glance event is further based on a calculated correlation between eye closure and head pose. In one embodiment the correlation is calculated from a machine learning procedure applied to past images of one or more subjects.

In accordance with a second aspect of the present invention there is provided a subject monitoring system to distinguish between a glance event and an eye closure event, the system including:
- a camera to capture a number of images of at least a portion of the subject's face including at least one eye of the subject over a period of time, each image being captured at a corresponding time within the period of time; and
- a processor operatively associated with the camera to:
  - process the images to determine a closure state of the at least one eye;
  - detect potential eye closure events in which the closure state of the at least one eye is determined to be in a closed state;
  - for times corresponding to a detected potential eye closure event, determining a corresponding head pitch angle of the subject; and
  - classify the potential eye closure event as a glance event if a head pitch angle of the subject is detected to change by an angle greater than a predetermined head pitch angle across the images corresponding to the detected potential eye closure event, and otherwise classify the potential eye closure event as an eye closure event.

In accordance with a third aspect of the present invention there is provided a method of distinguishing between a glance event and an eye closure event in a subject monitoring system, the method including:

a) capturing a number of images of at least a portion of the subject's face including at least one eye of the subject over a period of time, each image being captured at a corresponding time within the period of time;
b) processing the images to determine:
  (i) a head pose of the subject; and
  (ii) a closure state of the at least one eye;
c) detecting potential eye closure events in which the at least one eye is determined to be in a closed state;
d) for times corresponding to the detected potential eye closure event, calculating a correlation between the head pose and the closure state of the at least one eye; and
e) based on the calculated correlation, classifying the potential eye closure event as either a glance event or an eye closure event.

In accordance with a fourth aspect of the present invention there is provided a subject monitoring system to distinguish between a glance event and an eye closure event, the system including:
- a camera to capture a number of images of at least a portion of the subject's face including at least one eye of the subject over a period of time, each image being captured at a corresponding time within the period of time;
- a processor operatively associated with the camera to:
  - process the images to determine:
    (i) a head pose of the subject; and
    (ii) a closure state of the at least one eye;
  - detect potential eye closure events in which the at least one eye is determined to be in a closed state;
  - for times corresponding to the detected potential eye closure event, calculate a correlation between the head pose and the closure state of the at least one eye; and
  - based on the calculated correlation, classify the potential eye closure event as either a glance event or an eye closure event.

In accordance with a fifth aspect of the present invention there is provided a non-transitory computer-readable medium storing instructions that, when executed by one or more processors, causes the one or more processors to perform a method according to any one of the first or third aspects.

In accordance with a sixth aspect of the present invention there is provided a processor configured to perform a method according to any one of the first or third aspects.

BRIEF DESCRIPTION OF THE DRAWINGS

Preferred embodiments of the disclosure will now be described, by way of example only, with reference to the accompanying drawings in which.

DETAILED DESCRIPTION

System Overview

The methods described herein are adapted for use in systems for monitoring subjects such as drivers in vehicles, pilots of planes and flight simulators, and operators of machinery. The embodiments described herein will be described with particular reference to vehicle driver monitoring systems. An example driver monitoring system is illustrated schematically in FIGS. 2 to 4.

Figure 2:
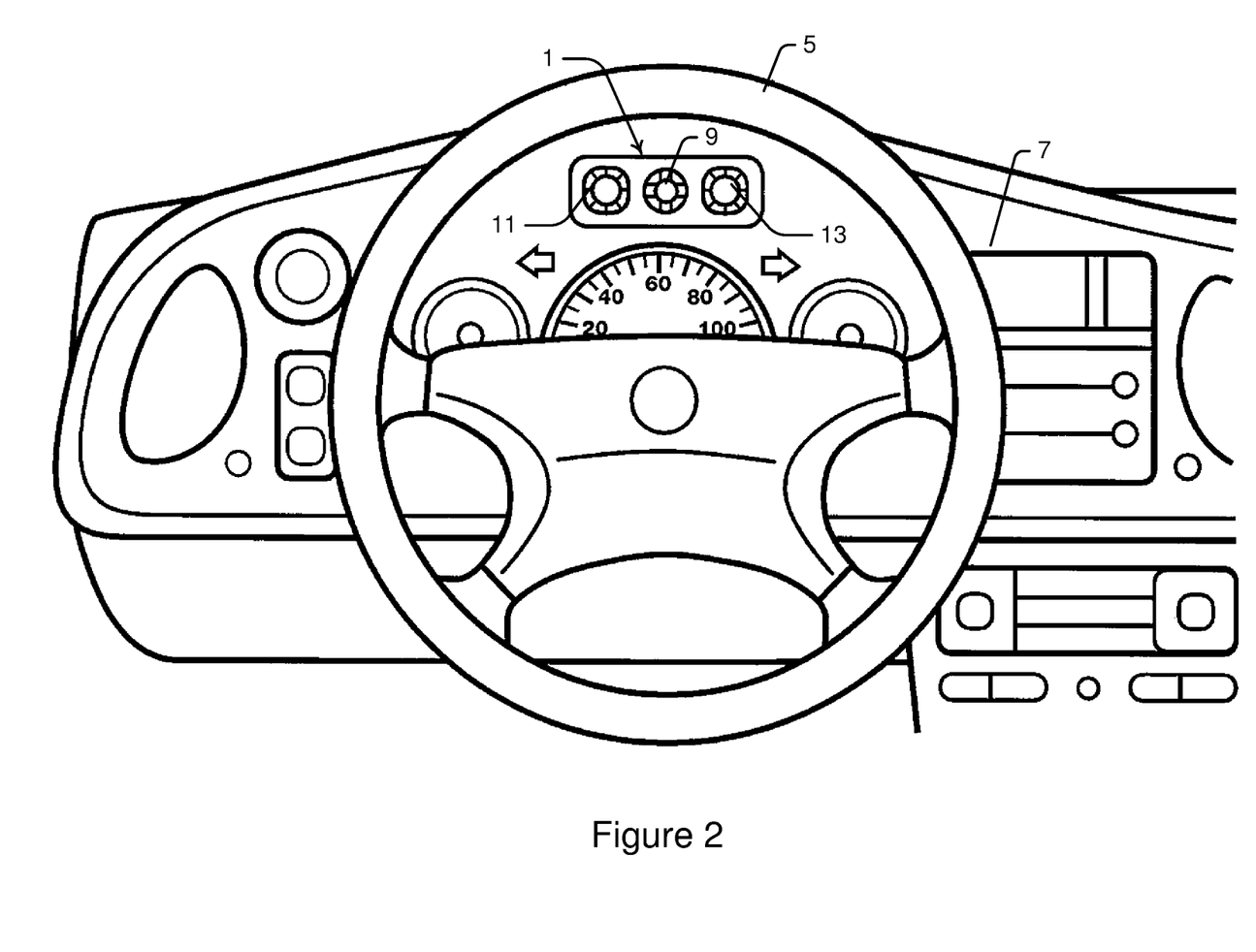
FIG. 2 is a front sectional view of a vehicle dash and windshield, as viewed from a driver's perspective, the vehicle dash including a driver monitoring system.
Figure 3:
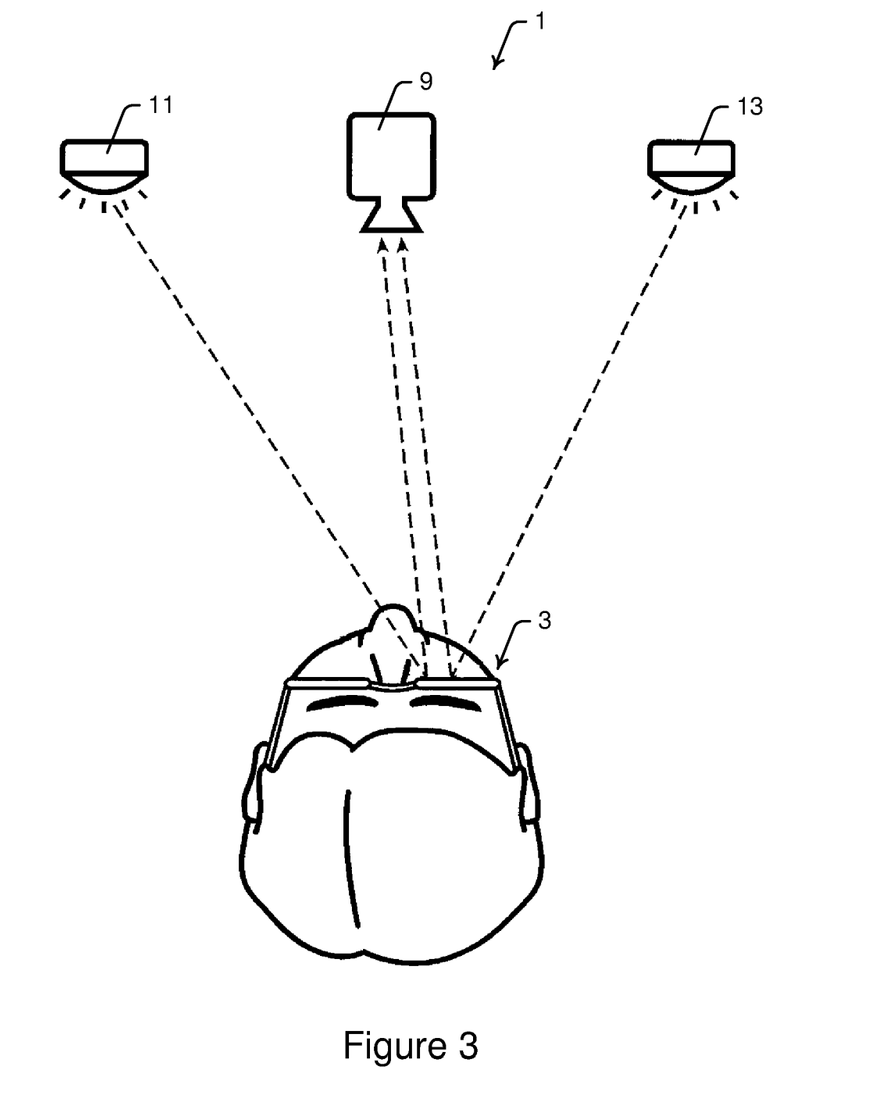
FIG. 3 is a top schematic view of a driver's head looking towards a driver monitoring system.

Referring initially to FIGS. 2 and 3, there is illustrated a vehicle dash-mounted system 1 for monitoring a driver's face 3. In the illustrated embodiment, system 1 is mounted behind a steering wheel 5 within the instrument panel 7 of the vehicle dashboard. However, it will be appreciated that system 1 can be mounted at other locations within the vehicle, provided that face 3 can be clearly monitored. Further, it will be appreciated that system 1 may be mounted to the vehicle during manufacture or separately mounted as an after-market product.

System 1 includes an imaging camera 9 for capturing images of the driver's face 3. Camera 9 is disposed between two light sources 11 and 13, which are preferably horizontally spaced apart from camera 9 at a distance in the range of 1 cm to 10 cm. In some embodiments, two or more cameras are used to image the driver from different viewpoints. This stereoscopic or multi-viewpoint image capture can be used to capture depth information from the images and more accurately determine head pose.

As illustrated in FIG. 3, sources 11 and 13 are configured to selectively illuminate the driver's face with infrared or other non-visible light during successive image capture by camera 9. However, in some embodiments, sources 11 and 13 may emit visible light. Sources 11 and 13 are disposed at substantially equal positions about camera 9 to provide differing illumination conditions. Typically, a facial image will include reflections or glare, say from glasses worn by the driver. Using different illumination conditions, glare present in images captured under illumination from one light source can be managed by using images captured by camera 9 under illumination from the other light source. In some embodiments, more than two light sources can be implemented in system 1. In alternative embodiments, the light sources may be located at other locations or various positions to vary the reflective angles between the light sources 11 and 13, the driver's face 3 and camera 9.

Additional components of the system may also be included within the common housing or may be provided as separate components according to other embodiments.

Figure 4:
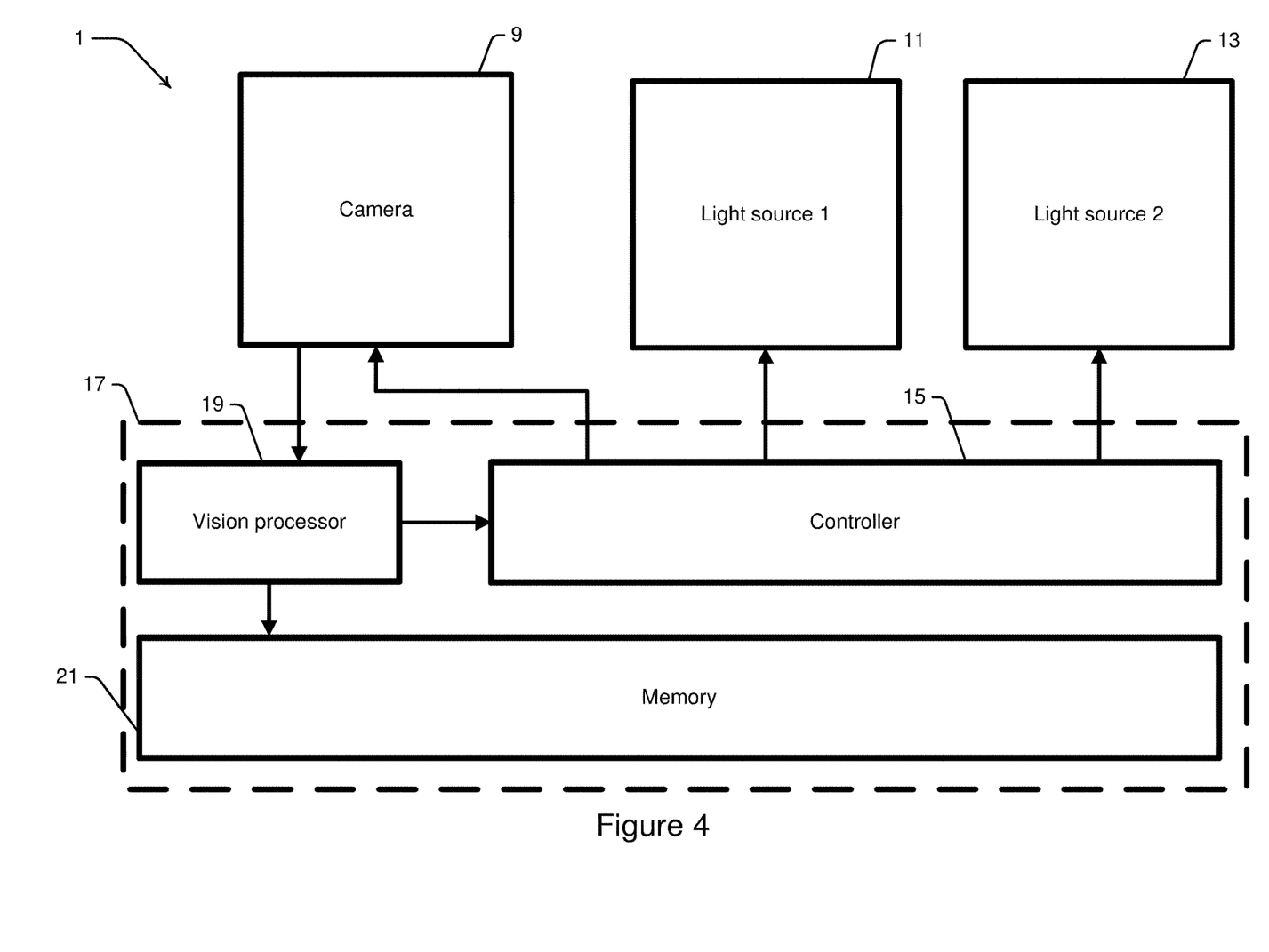
FIG. 4 is a schematic system-level diagram of a driver monitoring system.

Referring now to FIG. 4, control of camera 9 and light sources 11 and 13 is performed by a controller module 15 within a processor 17. Controller module 15 is configured to, inter alia, control the timing of illumination of sources 11 and 13, the illumination power of sources 11 and 13, and the timing and exposure time of camera 9. Processor 17 also includes a vision processor module 19 for performing various image processing of the images captured by camera 9. This image processing will be described in more detail below. From a processing point of view, vision processor 19 typically performs image processing on each captured image in a sequential manner to extract head pose and eye closure data. The extracted data of the images is buffered together with data from other images to perform the method described below. By way of example, extracted head pose and eye closure data from a buffered group of 12 images is used in sequence to perform the method. The data corresponding to the images themselves may be discarded. However, in other embodiments, vision processor 19 is able to process the captured images in a batched manner by buffering groups of images and performing image analysis on the groups of images on an ongoing basis.

Processor 17 may be implemented in the form of a single microprocessor, or microprocessor in conjunction with custom or specialized circuitry, executing code stored in an associated memory module 21. Memory module 21 may include memory such as random access memory (RAM), read-only memory (ROM), electrically erasable programmable read-only memory (EEPROM), and other equivalent memory or storage systems as should be readily apparent to those skilled in the art. Vision processor module 19 and controller module 15 may be integrated together within processor 17 or may be implemented in separate hardware and/or software or firmware within processor 17. In one embodiment, all of the functionality of processor 17 is implemented in a system-in-chip or other integrated circuit type design suitable for integrating flexible software programming with hardware based computing operations on a single chip substrate while providing low power consumption.

In some embodiments, processor 17 may be integrated with an on-board vehicle computer system, which also controls various other devices within the vehicle. In other embodiments, processor 17 and system 1 is contained within a protective housing that is able to be mounted to the vehicle.

Description of the Methodology

Figure 5:
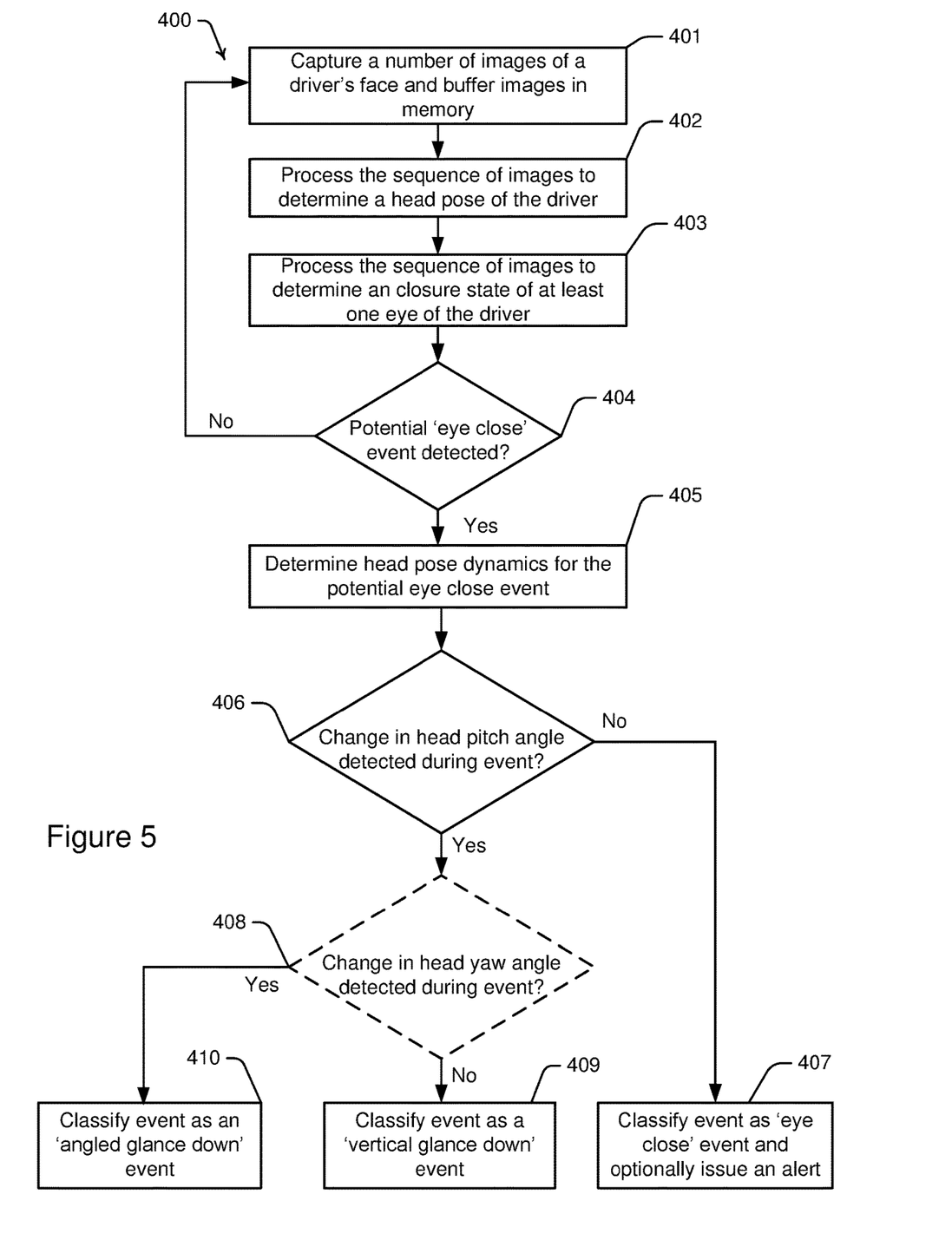
FIG. 5 is a process flow diagram illustrating the primary steps in a first method of distinguishing between a glance event and an eye closure event in a driver monitoring system.

Referring now to FIG. 5, there is illustrated a method 400 of distinguishing between a glance event and an eye closure event in a subject monitoring system such as system 1. Method 400 is performed by processor 17 and leverages the various components of system 1. At step 401, method 400 includes capturing, using camera 9 controlled by controller 15, a number of images of at least a portion of the subject's face over a period of time. The images are captured in a sequence such as a video sequence with each image captured at a particular time and allocated a corresponding digital timestamp. The camera is directed towards the driver's face so that the captured images include at least one and preferably both eyes of the driver. The images preferably also include the driver's nose and mouth to provide distinguishing points for determining the driver's head pose.

At optional step 402, vision processor 19 processes the captured images to determine a head pose of the driver. The head pose can be determined from a number of techniques known in the art in driver monitoring systems. By way of example, U.S. Pat. No. 7,043,056 to Edwards et al. entitled "Facial Image Processing System" and owned by the present Applicant (hereinafter "Edwards et al.") discloses a method of calculating head pose. In this method, the head pose is estimated from identifiable facial features (such as the corners of the mouth, eyes, nostrils and ears) and measuring the position and orientation of these features relative to each other. The estimated head pose includes at least a head pitch (up-down head glance) and a head yaw (side-to-side glance). Optionally the scale size of the driver's head may be used to estimate the distance between the camera and head to estimate the full 3-D head pose. In the case of a stereoscopic system having two imaging cameras or a single camera with depth estimation capability, a more accurate three dimensional head pose vector can be estimated.

At step 403, vision processor 19 processes the captured images to determine a closure state of the at least one eye. Like the head pose determination of step 402, the determination of a closure state could be performed in a number of ways known in the art in driver monitoring systems. For example, U.S. Pat. No. 5,878,156 entitled "Detection of The Open/closed State of Eyes Based on Analysis of Relation Between Eye and Eyebrow Images in Input Face Images" describes a technique for "detecting the open/closed state of the eyes based on analysis of relation between eye and eyebrow images in input face images". The technique binarizes the image regions surrounding the eye and eyebrow, determines which regions represent the eye and eyebrow, then calculates the distance between the centroids of these regions.

In one embodiment, the eye closure determination method of Edwards et al. is utilized. This method relies on the determined head pose of the driver, estimated in step 402. From the head pose determination, the eye regions in the images are extracted and eye closure determination is performed only on the eye regions of the images to reduce computational complexity.

Following Edwards et al., eye closure can be determined by the following steps:

1. determining the location of the eye corners within the eye region;
2. fitting at least two oriented edge detectors to the top eyelid and to the bottom eyelid, such that one of the oriented edge detectors of the top eyelid intersects with one oriented edge detector of the bottom eyelid at each eye corner;
3. approximating the position of the top eyelid, and the bottom eyelid, by fitting a parabola to the at least two oriented edge detectors corresponding to each eyelid, such that each parabola is tangential to the at least two oriented edge detectors of the parabola's respective eyelid;
4. determining the eye corner separation by calculating the distance between the eye corners determining the maximum eyelid distance by calculating the maximum distance between the parabolas on the portion of the parabolas between the eye corners, in a direction perpendicular to a line joining the eye corners; and
5. calculating the eye closure degree by taking the ratio of the determined eye corner separation to maximum eyelid distance.

The possible closure states include a plurality of states indicative of a degree of closure of the at least one eye. By way of example, the degree of closure could represent a value between 0 and 1 where a '0' represents full eye closure and a '1' represents a fully open eye. In a simple alternative embodiment, the closure states include only an open state and a closed state.

Noting that method 400 is preferably performed in a real-time or near real-time manner, the head pose and eye closure data extracted from the processed images in steps 402 and 403 are buffered in an ongoing basis by vision processor 19 and the buffered data is stored in memory 21. For example, the extracted data corresponding to a group of 12 image frames spaced adjacent in time are buffered and the following steps of method 400 are performed iteratively on sequential groups of data.

It will be appreciated that, if the frame rate of the captured images is sufficient, image processing steps 402 and 403 may be performed on only a subset of the captured images. For example, if camera 9 is able to capture images at 100 frames-per-second, steps 402 and 403 may only be performed on every second image to reduce the required processing power.

At decision step 404 of method 400, the captured images are assessed for detecting potential eye closure events in which the at least one eye is determined to be in a closed state. Potential eye closure events are characterized by the degree of closure of the driver's eyes. If the degree of eye closure is determined to be less than a predetermined eye closure threshold (which can be controlled by processor 17), then a potential eye closure event is detected. Due to uncertainty in detecting full eye closure, the predetermined eye closure threshold is generally set at higher than 0, say at 0.3. However, in more accurate systems, the threshold could be relaxed to 0.2 or lower.

If no potential eye closure event is detected at decision step 404, then the method returns to step 401 wherein a new batch of images are captured and/or a new group of buffered images are loaded for processing.

At step 405, for images corresponding to a detected potential eye closure event, corresponding head pose dynamics are determined for the event. At the broadest level, the head pose dynamics include the head pitch angle of the driver extracted from the determined head pose of the images corresponding to the event. However, the head pose dynamics can also include the head yaw angle of the driver extracted from the determined head pose of the images corresponding to the event.

When referring to the images corresponding to the detected potential eye closure events, these images preferably include a predetermined number of images captured immediately prior to the event and a predetermined period during or immediately after the event. This could represent images from one or more groups of buffered images. By way of example, if the event takes place over a period of 3 seconds, the sequence of images selected to be corresponding to that event may include images captured up to 2 seconds before the event and images captured during and up to 2 seconds after the event. This period of time provides a significant number of images in which to track the head pose.

At decision step 406, classification of the potential eye closure event is performed by assessing whether a sufficient change in head pitch angle of the subject is detected. The sufficient change is a change in head pitch angle that is greater than a predetermined head pitch angle across the images corresponding to the detected potential eye closure event. The predetermined head pitch angle represents a threshold angle which can be controlled by processor 17 automatically or through user input. An example predetermined head pitch angle is ±5 degrees. However, in some embodiments, the predetermined head pitch angle may be in the range of ±1° to ±10°. If the change in head pitch angle is detected to be less than the predetermined head pitch angle, then, at step 407, the event is classified as an actual 'eye close' event. Depending on the duration of the eye close event and the frequency of the event when considered with other similar events, the system may choose to issue an auditory or other type of alert to the driver to indicate drowsiness.

Primarily in vehicles, the glance event will represent a glance downwards to indicate a look towards the vehicle instrument panel or the driver's lap. In these cases, the head pitch angle will be negative representing a downward glance. However, in other applications, such as monitoring pilots in fighter jets, the pilot may glance upwards towards the open ceiling of the cockpit. Both downward and upward glances can be mischaracterized as eye closures in monitoring systems and both of these glances are able to be detected in the present invention. Although the situation of downward glances will be described herein, it will be appreciated by those skilled in the art that a similar method can be applied to an upward glance.

If a change in head pitch angle is detected to be downward and equal to or greater than the predetermined head pitch angle at step 406, then, at optional decision step 408, classification of the type of glance event is performed by assessing whether a sufficient change in head yaw angle of the driver is detected. The sufficient change is a change in head yaw angle that is greater than a predetermined head yaw angle across the images corresponding to the detected potential eye closure event. The predetermined head yaw angle represents a threshold angle which can be controlled by processor 17 automatically or through user input. An example predetermined head yaw angle is 5 degrees.

If the change in head yaw angle is determined to be less than the predetermined yaw angle, then, at step 409, the glance event is classified as a 'vertical glance down' event. This may represent a glance down at the instrument panel adjacent the steering wheel or a glance down to the driver's lap.

If the change in head yaw angle is determined to be equal to or greater than the predetermined yaw angle, then, at step 410, the glance event is classified as an 'angled glance down' event. This may represent a glance down and across towards a center console of the vehicle.

Figure 6:
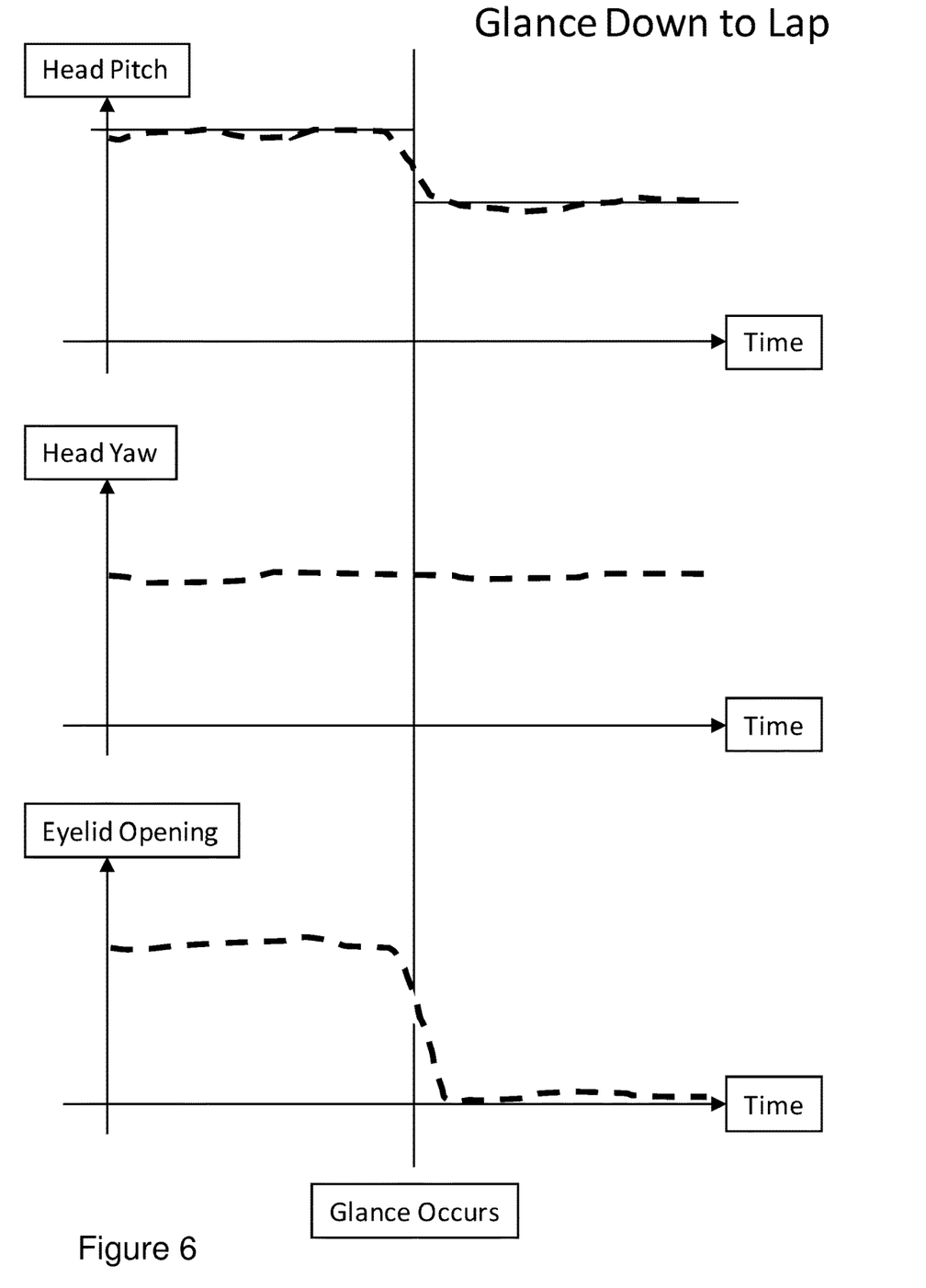
FIG. 6 illustrates graphs of simulated head pitch, head yaw and eyelid opening data as a function of time over an event in which a driver performs a glance down his/her lap.
Figure 7:
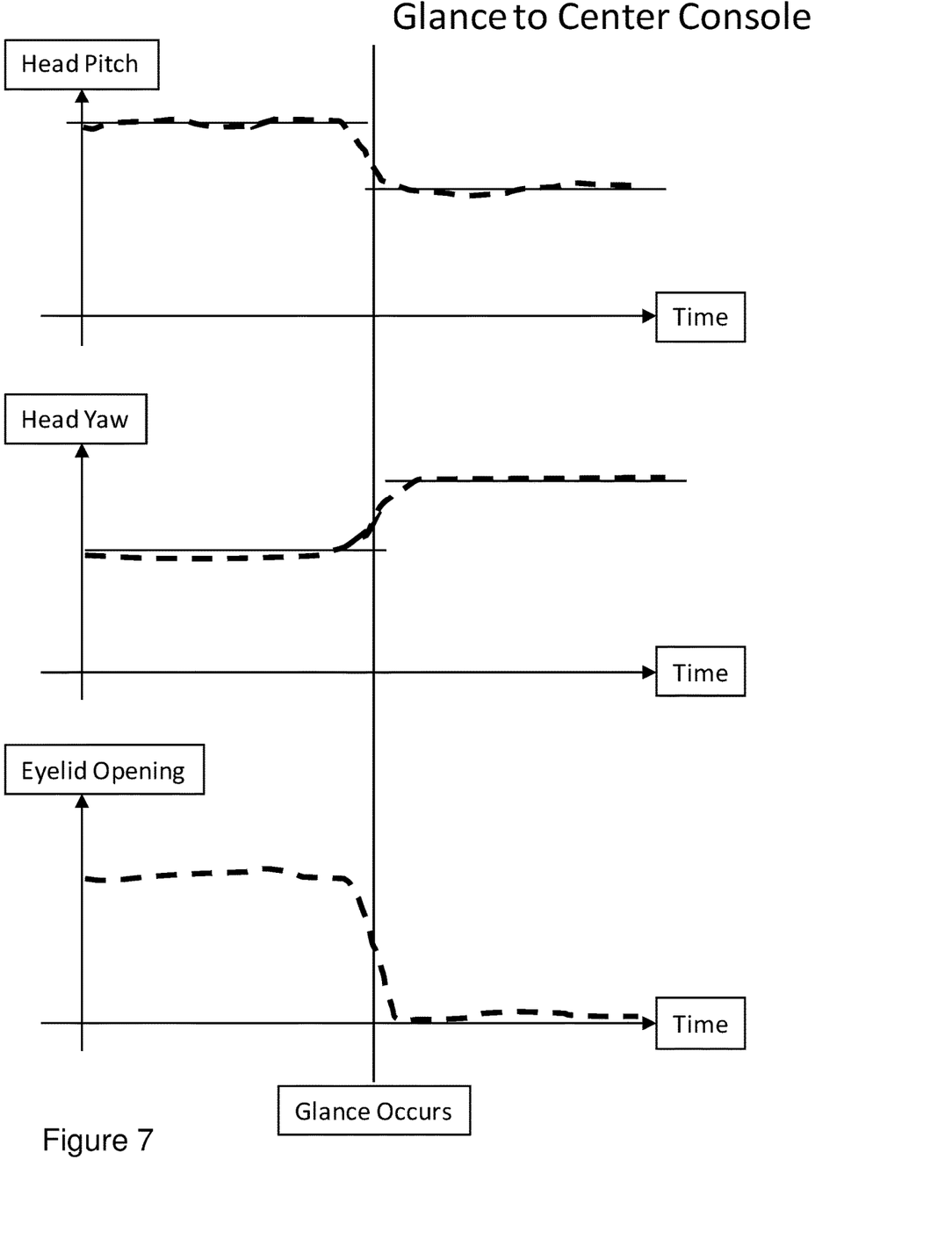
FIG. 7 illustrates graphs of simulated head pitch, head yaw and eyelid opening data as a function of time over an event in which a driver performs a glance towards a center console of a vehicle.
Figure 8:
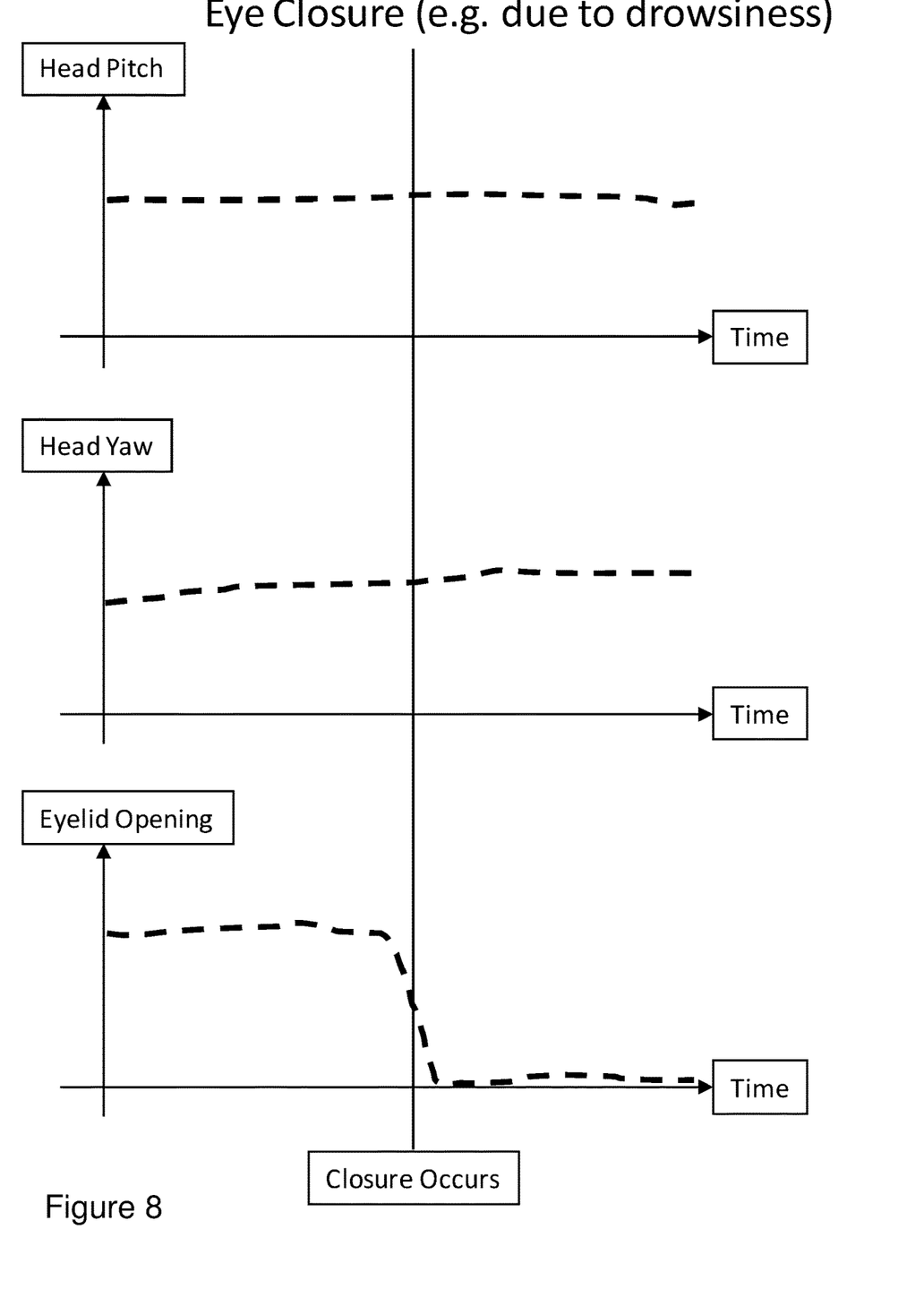
FIG. 8 illustrates graphs of simulated head pitch, head yaw and eyelid opening data as a function of time over an actual eye closure event in which a driver closes his/her eyes without performing any large head movements.

FIGS. 6 to 8 illustrate graphs of simulated head pitch, head yaw and eyelid opening (or closure) data as a function of time over different potential eye closure events as calculated from method 400. FIG. 6 illustrates a 'glance down to lap' event in which the head pitch angle is detected to decrease suddenly across the event in conjunction with the detected eye closure. FIG. 7 illustrates a 'glance to center console' event in which a sudden change in both head pitch angle and head yaw angle is detected across the event. FIG. 8 illustrates an 'actual eye closure' event in which no change in head pitch or head yaw angle is detected during the eye closure.

The scenarios of FIGS. 6 and 7 contribute to a driver's attention/distraction level and can be considered in a driver distraction monitoring system. For example, if the detected distraction events of FIGS. 6 and 7 are part of a series of glances from the driver within a predetermined time period, this may trigger the monitoring system to issue a visual and/or audio alert to the driver to indicate that they are becoming distracted from the road ahead.

Step 408 is optional as distinction between a 'glance down' event and an 'eye close' event can be performed with only the head pitch measurements. However, distinguishing between different glance down events is advantageous as it provides for inferring the driver's gaze. That is, distinguishing glance events can provide a crude measurement of eye gaze without performing a more complex eye gaze estimation algorithm. Further distinction between different glance events could be made by distinguishing between different combinations of head pitch and head yaw angles during potential eye closure event.

In one embodiment, the head pitch and yaw angles are determined relative to an angle recorded prior to the potential eye closure event. In other embodiments, the head pitch and yaw angles are determined relative to an angle between the subject's face and a camera which captures the images.

In the above described method, the eye closure is calculated based on head pose estimates which are calculated in a continuous or semi-continuous manner on the captured imaged. However, it will be appreciated that the degree of eye closure can be calculated independently of the head pose. For this reason, in some embodiments, the head pose may not be estimated prior to calculating eye closure for the whole sequence of images but only on a subset of the images once a potential eye closure event is detected. In these embodiments, step 402 is performed within step 405 and the computational complexity of the algorithm can be decreased while reducing the accuracy of the eye closure measurements. However, determining head pose prior to calculating eye closure also has some processing advantages in being able to only perform the eye closure detection on the identified regions of the images where the eyes are located. Further, incorporating the head pose into the eye closure determination can more accurately calculate an eye closure state.

More broadly, the invention relates to determining a correlation between eye closure and head pose time series data, as illustrated in the exemplary graphs of FIGS. 6 to 8. Where a high correlation (in time) exists between eye closure and head pose during a potential eye closure event, there is a high probability that the potential eye closure event is actually a downward or upward glance. Thus, in an alternative embodiment, the classification of events is based on correlation rather than actual threshold values of head pose.

Figure 9:
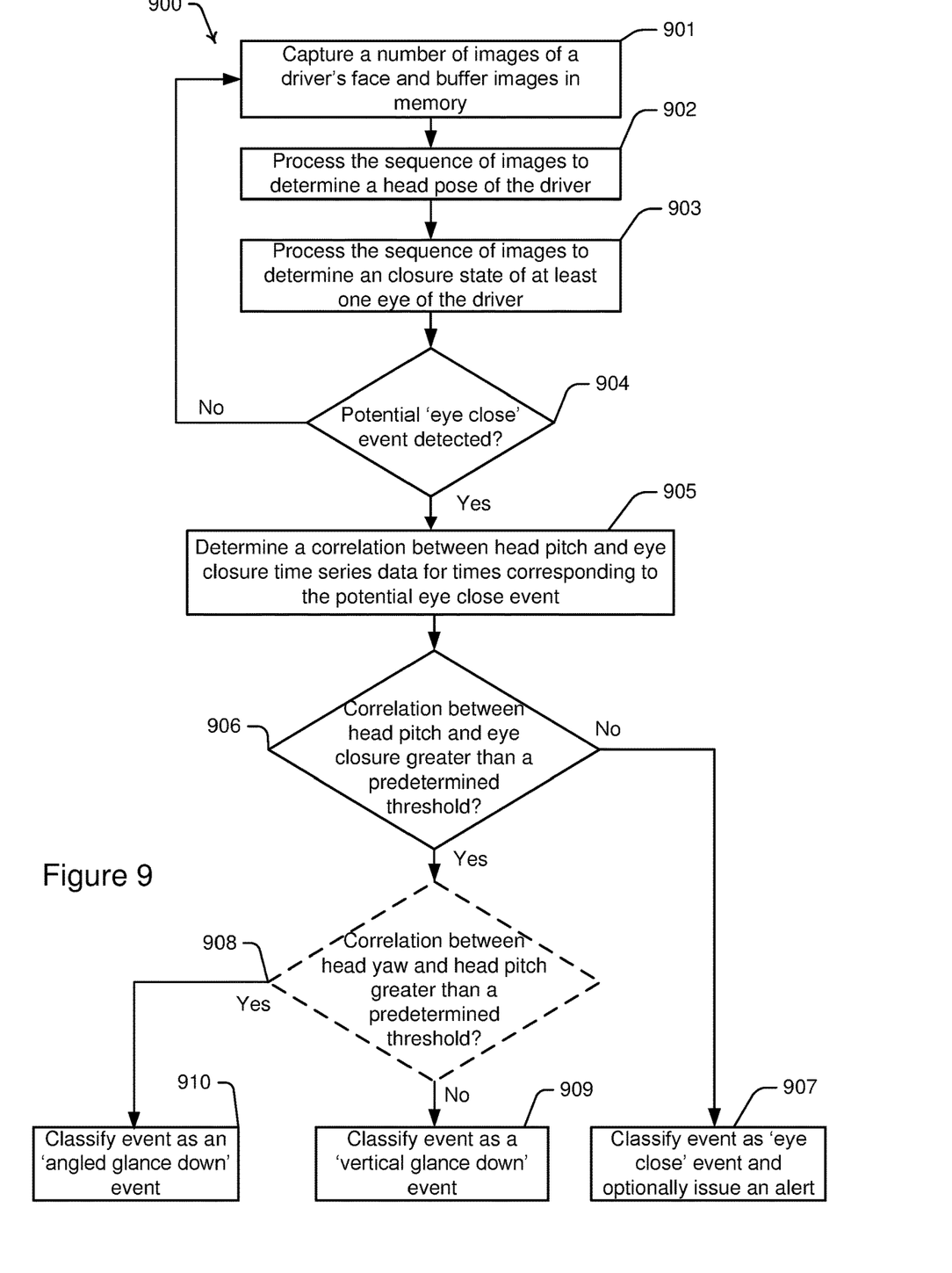
FIG. 9 is a process flow diagram illustrating the primary steps in a second method of distinguishing between a glance event and an eye closure event in a driver monitoring system.

Referring now to FIG. 9, there is illustrated a method 900 of distinguishing between a glance event and an eye closure event in a subject monitoring system such as system 1. Method 900 is similar to that of method 400 with the exception that steps 905, 906 and 908 are based on correlation between time series values of head pose and eye closure on and around the times of the detected potential eye closure events. At step 905, a correlation between head pitch and eye closure time series data for times corresponding to the potential eye close event is determined. The correlation can be estimated by a number of methods known in the art. In one example, the correlation coefficient $r_{xy}$ between the time series of head pitch (X) and eye closure (Y) is calculated numerically by the following formula:

$$r_{xy} = \frac{\sum_{i=1}^{n}(x_i - \bar{x})(y_i - \bar{y})}{\sqrt{\sum_{i=1}^{n}(x_i - \bar{x})^2 \sum_{i=1}^{n}(y_i - \bar{y})^2}}$$

Assuming a series of n measurements of X and Y written as $x_i$ and $y_i$ for i=1, 2, . . . , n, and where x and y are the sample means of X and Y. By way of example, the data used to calculate the correlation could represent data extracted from images captured between a time commencing two seconds prior to the detected potential eye closure event and ending two seconds after the detected potential eye closure event.

At decision step 906, classification of the potential eye closure event is performed by assessing whether the correlation calculated in step 905 is greater than a first predetermined threshold between 0 and 1. An example correlation threshold is 0.8. If the correlation is detected to be less than the first predetermined threshold, then, at step 907, the event is classified as an eye close event. If the correlation is detected to be less than or equal to the first predetermined threshold, then the event is classified as a glance event. At step 908, a further assessment is made as to what type of glance event has occurred by determining the correlation between head yaw and head pitch time series data around the potential eye closure event. If the correlation between head yaw and head pitch time series data is less than or equal to a second predetermined threshold (for example 0.8), then, at step 909, the event is classified as a vertical glance down event. If the correlation between head yaw and head pitch time series data is greater than the second predetermined threshold, then, at step 910, the event is classified as an angled glance down event.

In some embodiments, use is made of pre-recorded training data and machine learning to improve the correlation between eye closure states and head pose. The training data may use a significant number of images captured of different drivers under different head pose and eye closure conditions. As head movement and eye closure are generally universal behaviour among humans (although each human has different actual body mechanics), this correlation can be used to classify the potential eye closure event as a glance event or eye close event. This utilization of machine learning can provide significant increases in accuracy and also identify situations where the driver's eyes are closed at the same time as when they are looking down.

In a further embodiment (not illustrated), a combination of methods 400 and 900 can be utilized in which characterization of events is performed based on both the magnitude of head pose and the correlation between head pose and eye closure during potential eye closure events are considered.

It will be appreciated that the above systems and methods are capable of distinguishing between a glance event and an eye closure event in a subject monitoring system.

The invention relies on the premise that a glance down is often associated with a change in head pose of the subject (e.g. pitch angle), whereas a fatigue event is typically not. Therefore, if the system considers both the eye closure and head pose in combination, it is possible to resolve the difference between a glance down and fatigue events through correlation of the time series measurement of these characteristics.

An advantage of the present invention is that, when incorporated into a driver monitoring system, the system can more accurately characterize drowsiness events from distraction events and issue appropriate alerts to drivers. The more accurate characterizations can also be used to formulate an accurate characteristic profile of a particular driver (say, to characterize a driver who is prone to distraction or drowsiness).

Another advantage of the invention is that the determination of an amount of change in head pitch and head yaw during a potential eye closure event provides a simple method for inferring a driver's head gaze during the event. The head yaw component is particularly useful in more accurately classifying a driver's attention.

Interpretation

Throughout this specification, use of the term "element" is intended to mean either a single unitary component or a collection of components that combine to perform a specific function or purpose.

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "controller" or "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the preferred embodiments of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

We claim:

1. A method of distinguishing between a downward glance event and an eye closure event in a subject monitoring system, the method comprising:
    a) capturing a number of images of at least a portion of a subject's face including at least one eye of the subject over a period of time, each image being captured at a corresponding time within the period of time;
    b) processing the images to determine a closure state of the at least one eye from a plurality of predefined closure states;
    c) detecting potential eye closure events as a sequence of images in which the closure state of the at least one eye is determined to be in an at least partially closed state;
    d) upon detection of a potential eye closure event, further processing the sequence of images corresponding to the detected potential eye closure event to determine a corresponding head pitch angle of the subject across the sequence of images; and
    e) classifying the detected potential eye closure event as either a downward glance event or an actual eye closure event,
        wherein a downward glance event occurs when a head pitch angle of the subject is detected to change by an angle greater than a predetermined head pitch angle and the at least one eye is determined to be in an at least partially closed state across the sequence of images corresponding to the detected potential eye closure event, and wherein an actual eye closure event occurs when the head pitch angle of the subject is detected to change by an angle less than the predetermined head pitch angle and the at least one eye is determined to be in an at least partially closed state across the sequence of images corresponding to the detected potential eye closure event.

2. The method according to claim 1 wherein the predefined closure states include an open state and a closed state.

3. The method according to claim 1 wherein the predefined closure states include a plurality of states indicative of a degree of closure of the at least one eye.

4. The method according to claim 3 wherein potential eye closure events include events in which the degree of closure of the at least one eye is determined to be less than a predetermined eye closure threshold.

5. The method according to claim 4 wherein the degree of eye closure is represented by a value between 0 and 1 where a '0' represents full eye closure and a '1' represents a fully open eye, and wherein the predetermined eye closure threshold is 0.3.

6. The method according to claim 1 wherein the predetermined head pitch angle is ±5 degrees.

7. The method according to claim 1 wherein the head pitch angle is determined relative to an angle recorded prior to the detected potential eye closure event.

8. The method according to claim 1 wherein the head pitch angle is determined relative to an angle between the subject's face and a camera which captures the images.

9. The method according to claim 1 wherein the times corresponding to the detected potential eye closure events include times corresponding to images captured immediately prior to the detected potential eye closure event and times corresponding to images captured immediately after the detected potential eye closure event.

10. The method according to claim 1 wherein the head pitch angle of the subject is determined from a head pose estimate.

11. The method according to claim 10 including the step of calculating a head pose estimate prior to determining a closure state of the at least one eye.

12. The method according to claim 10 further including the step:
   d) i) for images corresponding to the detected potential eye closure event, processing the images to determine a corresponding head yaw angle of the subject.

13. The method according to claim 12 further including the step:
   f) for glance events, classifying the glance event as a 'vertical glance down' event if:
      (i) the head pitch angle of the subject is detected to be downward; and
      (ii) the head yaw angle of the subject is detected to change by an angle less than a predetermined head yaw angle across the images corresponding to the detected potential eye closure event.

14. The method according to claim 13 further including the step:
   g) for glance events, classifying the glance event as an 'angled glance down' event if:
      (i) the head pitch angle of the subject is detected to be downward; and
      (ii) the head yaw angle of the subject is detected to change by an angle greater than or equal to the predetermined head yaw angle across the images corresponding to the detected potential eye closure event.

15. The method according to claim 1 wherein the step of classifying the detected potential eye closure event as a glance event is further based on a calculated correlation between eye closure and head pose.

16. The method according to claim 15 wherein the correlation is calculated from a machine learning procedure applied to past images of one or more subjects.

17. A subject monitoring system to distinguish between a downward glance event and an eye closure event, the system comprising:
   a camera to capture a number of images of at least a portion of a subject's face including at least one eye of the subject over a period of time, each image being captured at a corresponding time within the period of time; and
   a processor operatively associated with the camera to:
      process the images to determine a closure state of the at least one eye from a plurality of predefined closure states;
      detect potential eye closure events as a sequence of images in which the closure state of the at least one eye is determined to be in an at least partially closed state;
      upon detection of a potential eye closure event, further processing the sequence of images corresponding to the detected potential eye closure event to determine a corresponding head pitch angle of the subject across the sequence of images; and
      classify the detected potential eye closure event as either a downward glance event or an actual eye closure event,
   wherein a downward glance event occurs when a head pitch angle of the subject is detected to change by an angle greater than a predetermined head pitch angle and the at least one eye is determined to be in an at least partially closed state across the sequence of images corresponding to the detected potential eye closure event, and wherein an actual eye closure event occurs when the head pitch angle of the subject is detected to change by an angle less than the predetermined head pitch angle and the at least one eye is determined to be in an at least partially closed state across the sequence of images corresponding to the detected potential eye closure event.

18. A method of distinguishing between a downward glance event and an eye closure event in a subject monitoring system, the method comprising:
   a) capturing a number of images of at least a portion of a subject's face including at least one eye of the subject over a period of time, each image being captured at a corresponding time within the period of time;
   b) processing the images to determine:
      (i) a head pose of the subject; and
      (ii) a closure state of the at least one eye;
   c) detecting potential eye closure events as a sequence of images in which the at least one eye is determined to be in an at least partially closed state;
   d) upon detection of a potential eye closure event, further processing the sequence of images corresponding to the detected potential eye closure event to calculate a correlation between the head pose and the closure state of the at least one eye across the sequence of images; and
   e) based on the calculated correlation, classifying the detected potential eye closure event as either a downward glance event in which the at least one eye is not closed or an actual eye closure event in which the at least one eye is closed,
      wherein a downward glance event occurs when a head pitch angle of the subject is detected to change by an angle greater than a predetermined head pitch angle and the at least one eye is determined to be in an at least partially closed state across the sequence of images corresponding to the detected potential eye closure event, and wherein an actual eye closure event occurs when the head pitch angle of the subject is detected to change by an angle less than the predetermined head pitch angle and the at least one eye is determined to be in an at least partially closed state across the sequence of images corresponding to the detected potential eye closure event.

19. A non-transitory computer-readable medium storing instructions that, when executed by one or more processors, causes the one or more processors to perform a method according to claim 18.

* * * * *

UNITED STATES PATENT AND TRADEMARK OFFICE
CERTIFICATE OF CORRECTION

| | |
|---|---|
| PATENT NO. | : 11,144,756 B2 |
| APPLICATION NO. | : 16/091356 |
| DATED | : October 12, 2021 |
| INVENTOR(S) | : John Noble and Grant Grubb |

Page 1 of 1

It is certified that error appears in the above-identified patent and that said Letters Patent is hereby corrected as shown below:

In the Specification

Column 10, Line 53 should read:
If the correlation is detected to be greater than the first predetermined threshold, then, at step 907, the event is classified as an eye close event.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*